United States Patent
Parker et al.

(10) Patent No.: US 11,960,741 B2
(45) Date of Patent: Apr. 16, 2024

(54) IMPLIED STREAMS

(71) Applicant: Western Digital Technologies, Inc., San Jose, CA (US)

(72) Inventors: Liam Parker, Edinburgh (GB); Matias Bjorling, Copenhagen (DK); Michael James, Longmont, CO (US)

(73) Assignee: Western Digital Technologies, Inc., San Jose, CA (US)

( * ) Notice: Subject to any disclaimer, the term of this patent is extended or adjusted under 35 U.S.C. 154(b) by 196 days.

(21) Appl. No.: 17/588,682

(22) Filed: Jan. 31, 2022

(65) Prior Publication Data
US 2022/0391095 A1   Dec. 8, 2022

Related U.S. Application Data

(60) Provisional application No. 63/197,688, filed on Jun. 7, 2021.

(51) Int. Cl.
*G06F 12/00* (2006.01)
*G06F 3/06* (2006.01)

(52) U.S. Cl.
CPC ............ *G06F 3/064* (2013.01); *G06F 3/0613* (2013.01); *G06F 3/0659* (2013.01); *G06F 3/0679* (2013.01)

(58) Field of Classification Search
CPC ...... G06F 3/064; G06F 3/0613; G06F 3/0659; G06F 3/0679; G06F 12/0246; G06F 12/10; G06F 2212/7201
See application file for complete search history.

(56) References Cited

U.S. PATENT DOCUMENTS

| | | | |
|---|---|---|---|
| 9,785,366 B1 | 10/2017 | Morley et al. | |
| 2018/0059988 A1 | 3/2018 | Shivanand et al. | |
| 2019/0205274 A1 | 7/2019 | Bhimani et al. | |
| 2020/0034076 A1 | 1/2020 | Zentz et al. | |
| 2021/0223954 A1* | 7/2021 | Yang | G06F 3/061 |

FOREIGN PATENT DOCUMENTS

EP   3021209 A1   5/2016

OTHER PUBLICATIONS

International Search Report and Written Opinion for International Application No. PCT/US2022/018716 dated Feb. 17, 2023.

* cited by examiner

*Primary Examiner* — Shawn X Gu
(74) *Attorney, Agent, or Firm* — PATTERSON + SHERIDAN, LLP

(57) ABSTRACT

The present disclosure generally relates to writing data to streams. A host device can instruct a data storage device to operate in implied streams mode such that the host device does not need to tell the data storage device the specific stream in which to write data. The data storage device would maintain a list of open append points of specific streams. Upon receiving a write command, the data storage device determines whether the write command is for an already open stream, and if so, write to the specific stream. If not, then the data storage device opens a new stream or write the data to an overflow stream.

19 Claims, 3 Drawing Sheets

IMPLIED STREAMS

CROSS-REFERENCE TO RELATED APPLICATIONS

This application claims benefit of U.S. Provisional Patent Application Ser. No. 63/197,688, filed Jun. 7, 2021, which is herein incorporated by reference.

BACKGROUND OF THE DISCLOSURE

Field of the Disclosure

Embodiments of the present disclosure generally relate to streams of a data storage device, such as a solid state drive (SSD).

Description of the Related Art

Storage devices, such as SSDs, may be used in computers in applications where relatively low latency and high capacity storage are desired. For example, SSDs may exhibit lower latency, particularly for random reads and writes, than hard disk drives (HDDs). Typically, a controller of the SSD receives a command to read or write data from a host device to a memory device. The data is read and written to one or more erase blocks in the memory device. Each of the erase blocks is associated with a logical block address so that the SSD and/or the host device knows the location of where the data, such as user data, parity data, metadata, and other applicable data, is stored. A logical to physical address (L2P) table stored in volatile memory of the SSD associates the logical block address (LBA) of the data to a physical address of where the data is stored in the SSD when the data is written.

One or more erase blocks may be grouped together by their respective logical block addresses to form a plurality of streams. When the host device sends a write command, the write command includes at least a stream ID and one or more LBAs associated with the data of the write command. Because streams have multiple write points within the LBA space of a data storage device, the host device may write to the multiple write points and still achieve a write amplification factor (WAF) of 1. However, because the host device is required to notify the data storage device which stream every write is destined for, the host device may be heavily burdened by having to include each and every notification.

Therefore, there is a need in the art for a new method of writing data to streams.

SUMMARY OF THE DISCLOSURE

The present disclosure generally relates to effectively and efficiently writing data to streams. A host device can instruct a data storage device to operate in implied streams mode such that the host device does not need to tell the data storage device the specific stream in which to write data. The data storage device would maintain a list of open append points of specific streams. Upon receiving a write command, the data storage device determines whether the write command is for an already open stream, and if so, write to the specific stream. If not, then the data storage device opens a new stream or write the data to an overflow stream.

In one embodiment, a data storage device comprises: a memory device having stream architecture, the stream architecture dividing the memory device into a plurality of streams; and a controller coupled to the memory device, the controller configured to: enter an implied streams mode; receive a write command from a host device; and determine a stream associated with the write command based on one or more logical block addresses (LBAs) of the write command, wherein a stream identifier (ID) is not sent with the write command.

In another embodiment, a data storage device comprises: a memory device having stream architecture, the stream architecture dividing the memory device into a plurality of streams; and a controller coupled to the memory device, the controller configured to: receive an indication from a host device to enter an implied streams mode, wherein the host device does not send a stream identifier (ID) with a write command during the implied streams mode; and determine a stream associated with a write command based on one or more logical block addresses (LBAs) for each write command received from the host device.

In another embodiment, a data storage device comprises: memory means having stream architecture, the stream architecture dividing the memory means into a plurality of streams; and a controller coupled to the memory means, the controller configured to: program data of a write command to a stream of the plurality of streams, wherein the stream is selected based on one or more logical block addresses (LBAs) of the write command, wherein each stream has a plurality of stream granularity size (SGS) LBA ranges, and wherein a stream identifier (ID) is not included with the write command.

BRIEF DESCRIPTION OF THE DRAWINGS

So that the manner in which the above-recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

In the following, reference is made to embodiments of the disclosure. However, it should be understood that the disclosure is not limited to specifically described embodiments. Instead, any combination of the following features and elements, whether related to different embodiments or not, is contemplated to implement and practice the disclosure. Furthermore, although embodiments of the disclosure may achieve advantages over other possible solutions and/or over the prior art, whether or not a particular advantage is achieved by a given embodiment is not limiting of the disclosure. Thus, the following aspects, features, embodiments, and advantages are merely illustrative and are not considered elements or limitations of the appended claims except where explicitly recited in a claim(s). Likewise, reference to "the disclosure" shall not be construed as a generalization of any inventive subject matter disclosed herein and shall not be considered to be an element or limitation of the appended claims except where explicitly recited in a claim(s).

The present disclosure generally relates to effectively and efficiently writing data to streams. A host device can instruct a data storage device to operate in implied streams mode such that the host device does not need to tell the data storage device the specific stream in which to write data. The data storage device would maintain a list of open append points of specific streams. Upon receiving a write command, the data storage device determines whether the write command is for an already open stream, and if so, write to the specific stream. If not, then the data storage device opens a new stream or write the data to an overflow stream.

Figure 1:
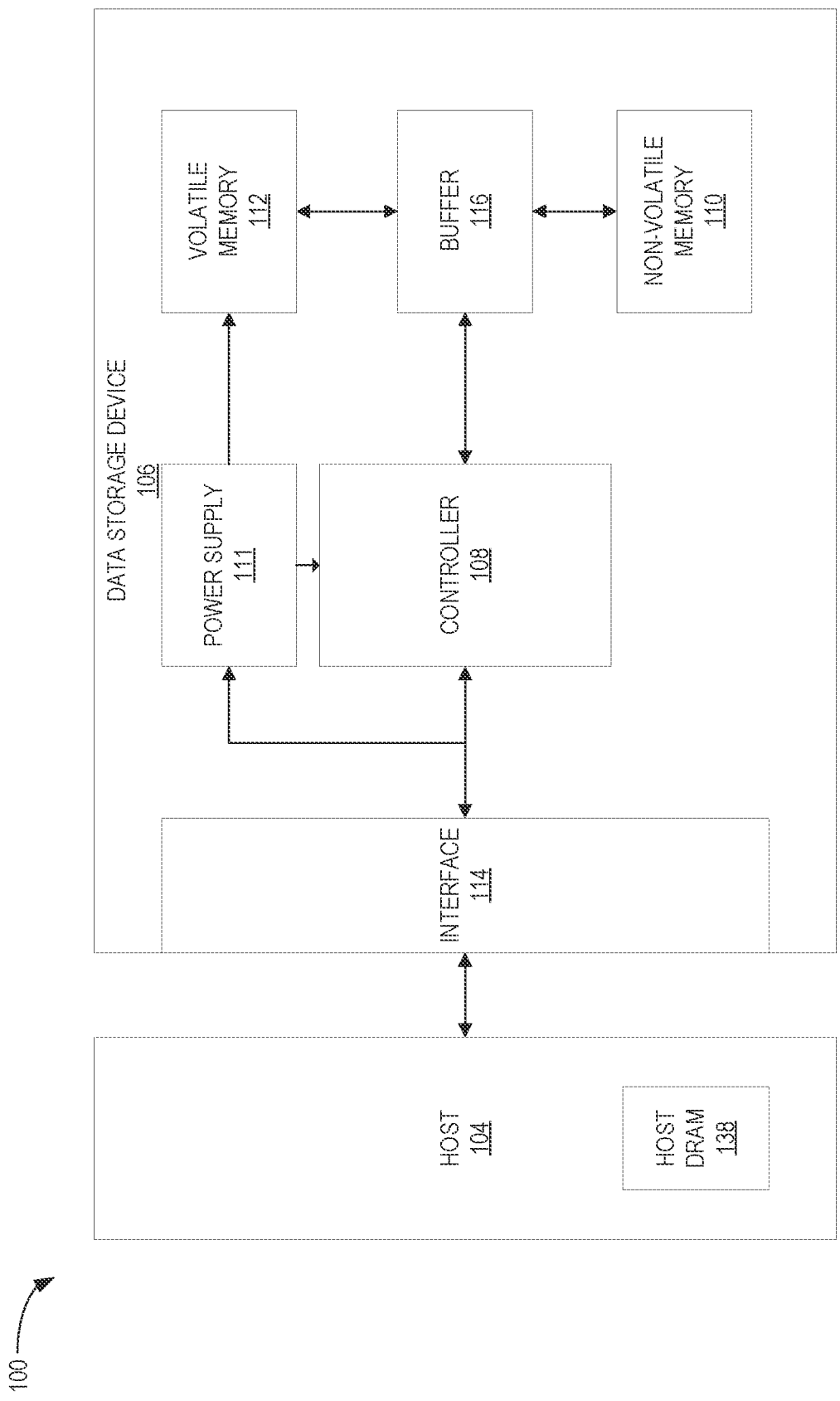
FIG. 1 is a schematic block diagram illustrating a storage system in which a data storage device may function as a storage device for a host device, according to certain embodiments.

FIG. 1 is a schematic block diagram illustrating a storage system 100 in which a host device 104 is in communication with a data storage device 106, according to certain embodiments. For instance, the host device 104 may utilize a non-volatile memory (NVM) 110 included in data storage device 106 to store and retrieve data. The host device 104 comprises a host DRAM 138. In some examples, the storage system 100 may include a plurality of storage devices, such as the data storage device 106, which may operate as a storage array. For instance, the storage system 100 may include a plurality of data storage devices 106 configured as a redundant array of inexpensive/independent disks (RAID) that collectively function as a mass storage device for the host device 104.

The host device 104 may store and/or retrieve data to and/or from one or more storage devices, such as the data storage device 106. As illustrated in FIG. 1, the host device 104 may communicate with the data storage device 106 via an interface 114. The host device 104 may comprise any of a wide range of devices, including computer servers, network attached storage (NAS) units, desktop computers, notebook (i.e., laptop) computers, tablet computers, set-top boxes, telephone handsets such as so-called "smart" phones, so-called "smart" pads, televisions, cameras, display devices, digital media players, video gaming consoles, video streaming device, or other devices capable of sending or receiving data from a data storage device.

The data storage device 106 includes a controller 108, NVM 110, a power supply 111, volatile memory 112, the interface 114, and a write buffer 116. In some examples, the data storage device 106 may include additional components not shown in FIG. 1 for the sake of clarity. For example, the data storage device 106 may include a printed circuit board (PCB) to which components of the data storage device 106 are mechanically attached and which includes electrically conductive traces that electrically interconnect components of the data storage device 106, or the like. In some examples, the physical dimensions and connector configurations of the data storage device 106 may conform to one or more standard form factors. Some example standard form factors include, but are not limited to, 3.5" data storage device (e.g., an HDD or SSD), 2.5" data storage device, 1.8" data storage device, peripheral component interconnect (PCI), PCI-extended (PCI-X), PCI Express (PCIe) (e.g., PCIe x1, x4, x8, x16, PCIe Mini Card, MiniPCI, etc.). In some examples, the data storage device 106 may be directly coupled (e.g., directly soldered or plugged into a connector) to a motherboard of the host device 104.

Interface 114 may include one or both of a data bus for exchanging data with the host device 104 and a control bus for exchanging commands with the host device 104. Interface 114 may operate in accordance with any suitable protocol. For example, the interface 114 may operate in accordance with one or more of the following protocols: advanced technology attachment (ATA) (e.g., serial-ATA (SATA) and parallel-ATA (PATA)), Fibre Channel Protocol (FCP), small computer system interface (SCSI), serially attached SCSI (SAS), PCI, and PCIe, non-volatile memory express (NVMe), OpenCAPI, GenZ, Cache Coherent Interface Accelerator (CCIX), Open Channel SSD (OCSSD), or the like. Interface 114 (e.g., the data bus, the control bus, or both) is electrically connected to the controller 108, providing an electrical connection between the host device 104 and the controller 108, allowing data to be exchanged between the host device 104 and the controller 108. In some examples, the electrical connection of interface 114 may also permit the data storage device 106 to receive power from the host device 104. For example, as illustrated in FIG. 1, the power supply 111 may receive power from the host device 104 via interface 114.

The NVM 110 may include a plurality of memory devices or memory units. NVM 110 may be configured to store and/or retrieve data. For instance, a memory unit of NVM 110 may receive data and a message from controller 108 that instructs the memory unit to store the data. Similarly, the memory unit may receive a message from controller 108 that instructs the memory unit to retrieve data. In some examples, each of the memory units may be referred to as a die. In some examples, the NVM 110 may include a plurality of dies (i.e., a plurality of memory units). In some examples, each memory unit may be configured to store relatively large amounts of data (e.g., 128 MB, 256 MB, 512 MB, 1 GB, 2 GB, 4 GB, 8 GB, 16 GB, 32 GB, 64 GB, 128 GB, 256 GB, 512 GB, 1 TB, etc.).

In some examples, each memory unit may include any type of non-volatile memory devices, such as flash memory devices, phase-change memory (PCM) devices, resistive random-access memory (ReRAM) devices, magneto-resistive random-access memory (MRAM) devices, ferroelectric random-access memory (F-RAM), holographic memory devices, and any other type of non-volatile memory devices.

The NVM 110 may comprise a plurality of flash memory devices or memory units. NVM Flash memory devices may include NAND or NOR based flash memory devices and may store data based on a charge contained in a floating gate of a transistor for each flash memory cell. In NVM flash memory devices, the flash memory device may be divided into a plurality of dies, where each die of the plurality of dies includes a plurality of physical or logical blocks, which may be further divided into a plurality of pages. Each block of the plurality of blocks within a particular memory device may include a plurality of NVM cells. Rows of NVM cells may be electrically connected using a word line to define a page of a plurality of pages. Respective cells in each of the plurality of pages may be electrically connected to respective bit lines. Furthermore, NVM flash memory devices may be 2D or 3D devices and may be single level cell (SLC), multi-level cell (MLC), triple level cell (TLC), or quad level cell (QLC). The controller 108 may write data to and read data from NVM flash memory devices at the page level and erase data from NVM flash memory devices at the block level.

The power supply 111 may provide power to one or more components of the data storage device 106. When operating in a standard mode, the power supply 111 may provide power to one or more components using power provided by an external device, such as the host device 104. For instance, the power supply 111 may provide power to the one or more components using power received from the host device 104 via interface 114. In some examples, the power supply 111 may include one or more power storage components configured to provide power to the one or more components when operating in a shutdown mode, such as where power ceases to be received from the external device. In this way, the power supply 111 may function as an onboard backup power source. Some examples of the one or more power storage components include, but are not limited to, capacitors, super-capacitors, batteries, and the like. In some examples, the amount of power that may be stored by the one or more power storage components may be a function of the cost and/or the size (e.g., area/volume) of the one or more power storage components. In other words, as the amount of power stored by the one or more power storage components increases, the cost and/or the size of the one or more power storage components also increases.

The volatile memory 112 may be used by controller 108 to store information. Volatile memory 112 may include one or more volatile memory devices. In some examples, controller 108 may use volatile memory 112 as a cache. For instance, controller 108 may store cached information in volatile memory 112 until the cached information is written to the NVM 110. As illustrated in FIG. 1, volatile memory 112 may consume power received from the power supply 111. Examples of volatile memory 112 include, but are not limited to, random-access memory (RAM), dynamic random access memory (DRAM), static RAM (SRAM), and synchronous dynamic RAM (SDRAM (e.g., DDR1, DDR2, DDR3, DDR3L, LPDDR3, DDR4, LPDDR4, and the like)).

Controller 108 may manage one or more operations of the data storage device 106. For instance, controller 108 may manage the reading of data from and/or the writing of data to the NVM 110. In some embodiments, when the data storage device 106 receives a write command from the host device 104, the controller 108 may initiate a data storage command to store data to the NVM 110 and monitor the progress of the data storage command. Controller 108 may determine at least one operational characteristic of the storage system 100 and store the at least one operational characteristic in the NVM 110. In some embodiments, when the data storage device 106 receives a write command from the host device 104, the controller 108 temporarily stores the data associated with the write command in the internal memory or write buffer 116 before sending the data to the NVM 110.

Figure 2:
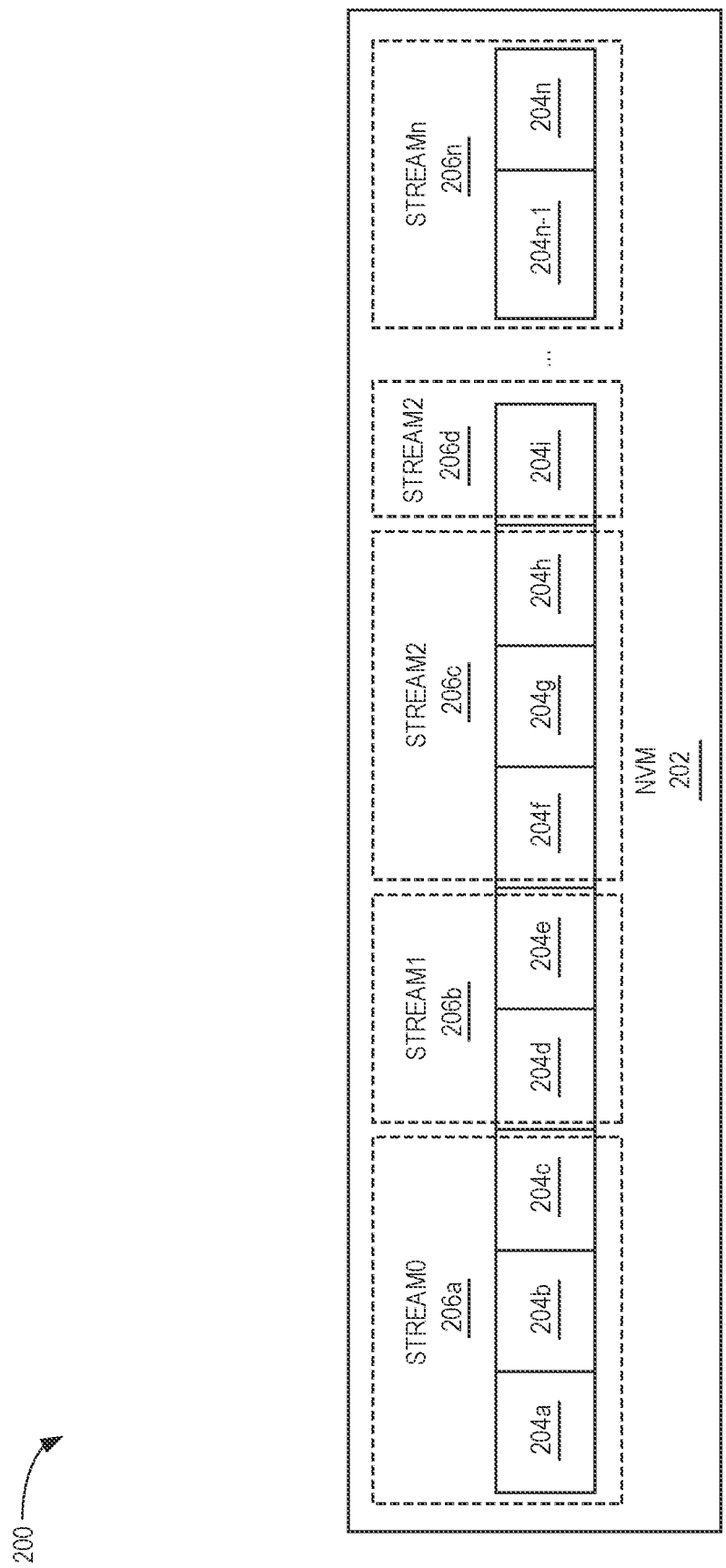
FIG. 2 is a schematic block diagram illustrating a non-volatile memory having a stream architecture, according to certain embodiments.

FIG. 2 is a schematic block diagram 200 illustrating an NVM 202 having a stream architecture, according to certain embodiments. The NVM 202 may be the NVM 110 of FIG. 1. In one embodiment, the NVM 202 is a NAND device. The NAND device includes a plurality of dies 204a-204n (collectively referred to as dies 204). Each of the one or more dies comprises one or more planes. Each of the one or more planes includes one or more blocks. Each of the one or more blocks includes one or more wordlines (e.g., 256 wordlines). Each of the one or more wordlines may be addressed in one or more pages.

For example, an MLC NAND die may use upper page and lower page to reach the two bits in each cell of the full wordline (e.g., 16 kB per page). Furthermore, each page can be accessed at a granularity equal to or smaller than the full page. A controller, such as the controller 108 of FIG. 1, may frequently access NAND in user data granularity LBA sizes of 512 bytes. Thus, as referred to in the below description, NAND locations are equal to a granularity of 512 bytes. As such, an LBA size of 512 bytes and a page size of 16 KiB for two pages of an MLC NAND results in 32 LBAs per wordline. However, the NAND location size is not intended to be limiting, and is merely used as an example.

The NVM 202 can be formatted into logical blocks such that the capacity of the NVM 202 is divided into a plurality of streams 206a-206n (collectively referred to as streams 206). Each of the streams 206 may have a state that is open and active, open and closed, empty, full, or offline. An empty stream switches to an open and active stream once a write is scheduled to the stream or if a stream open command is issued by the host device, such as the host device 104 of FIG. 1. The controller 108 can move a stream between stream open and stream closed states, which are both active states. If a stream is active, the stream includes open blocks that may be written to, and the host device 104 may be provided a description of recommended time in the active state.

The term "written to" includes programming user data on 0 or more NAND locations in a block and/or partially filled NAND locations in a block when user data has not filled all of the available NAND locations. The term "written to" may further include moving a stream to full due to internal drive handling needs (open block data retention concerns because the bits in error accumulate more quickly on open erase blocks), the data storage device, such as the data storage device 106 of FIG. 1, closing or filling a stream due to resource constraints, such as too many open streams to track or in a discovered defect state, among others, or the host device 104 closing the stream for concerns, such as no more data to send the data storage device 106, computer shutdown, error handling on the host, limited host resources for tracking, among others.

Active streams may be either open or closed. An open stream is an empty or partially full stream that is ready to be written to and has resources currently allocated. The data received from the host device 104 with a write command may be programmed to an open block that is not currently filled with prior data. A closed stream is an empty or partially full stream that is not currently receiving writes from the host device 104 in an ongoing basis. The movement of a stream from an open state to a closed state allows the controller 108 to reallocate resources to other tasks. These tasks may include, but are not limited to, other streams that are open, other conventional non-stream regions, or other controller 108 needs.

Each of the streams 206 includes one or more dies of the plurality of dies 204. Each of the dies 204 is composed of two planes (not shown), and each plane includes a plurality of blocks (not shown). It is to be understood that each of the dies 204 may include more than two planes in a multiple of 2. For example, each of the dies 204 may include 2x planes, where "x" refers to an integer value. User data may be stored in any die of the plurality of dies 204. Furthermore, each of the blocks are associated a plurality of logical blocks (not shown).

Each of the streams 206 may be a different size. For example, a first stream0 206a includes a first die 204a, a second die 204b, and a third die 204c. Likewise, a second stream1 206b includes a fourth die 204d and a fifth die 204e. Furthermore, each of the streams 206 are not required to be aligned to the capacity of one or more blocks of a NVM or NAND device. A stream granularity size (SGS) is an optimal write size agreed on between the host device 104 and the data storage device 106. The SGS may be a factory setting of the data storage device 106. Write sizes received in sizes less than the SGS may still be written to the relevant stream; however, the write performance may be limited. Furthermore, the SGS may be size of a superblock, where the superblock is a logical aggregation of blocks of the NVM 202.

When the data storage device 106 is coupled to the host device 104, the data storage device 106 exposes the number of streams supported by the data storage device 106. Thus, the host device 104 is aware of the number of streams that the write commands may correspond to. The data storage device 106 divides the LBA space of the NVM 202 into a discrete number of SGS sized contiguous LBA ranges (hereinafter SGS LBA range). Furthermore, the controller 108 may maintain a list of open append points that point to one or more specific SGS LBA ranges. The list may be maintained in a flash translation layer (FTL) table of the controller 108. The open append points are indications of where in the SGS LBA range the data of the next write command may be programmed to.

When the controller 108 receives or fetches a command from a submission queue of a host device 104, the command is received with a stream ID (e.g., stream0), which tells the controller 108 which stream of the plurality of streams 206a-206n to write the data associated with the command to. The host device 104 may select the stream ID for a command based on the data that the host device 104 wants to be grouped together. Thus, the data stored within each of the streams 206 may be related or grouped together as determined by the host device 104.

Rather than the host device 104 instructing the controller 108 to program data to a certain stream, the host device 104 may instruct the controller 108 to enter an "implied streams" mode. In the "implied streams" mode, the controller 108 determines the stream to program the data of the write command, rather than the host device 104 sending a stream ID with the write command. The determined stream may be based on the one or more LBAs of the write command. As each write command is received by the controller 108, the controller 108 determines if the write command is for an open SGS LBA range (e.g., a SGS LBA range corresponding to an open stream) by checking the one or more LBAs of the write command against the FTL table. If the write is for an open SGS LBA range, then the controller 108 schedules the write to be programmed to the corresponding open append point or LBA append point. However, if the write command is not for an open SGS LBA range, then the controller 108 may determine a relevant stream or SGS LBA range append point to open, such that the write command is sent to the new SGS LBA range append point.

Because the host device 104 is not restricted to any size granularity, the controller 108 in the SSD must be prepared to grow or shrink the streams. The controller 108 will select a granularity of one or more blocks and add units of the granularity of one or more blocks to the stream as more physical capacity is required by the streams. If data is unmapped, deallocated, or trimmed, the controller 108 may choose to erase blocks and return them to the free block pool, where available blocks (i.e., unallocated blocks) may be added to a stream needing additional capacity. Further, there may be occasions where stream data is overwritten. Thus, the controller 108 may execute garbage collection within one stream or among several streams concurrently to compact the physical space and reclaim blocks when the free block pool is low.

Figure 3:
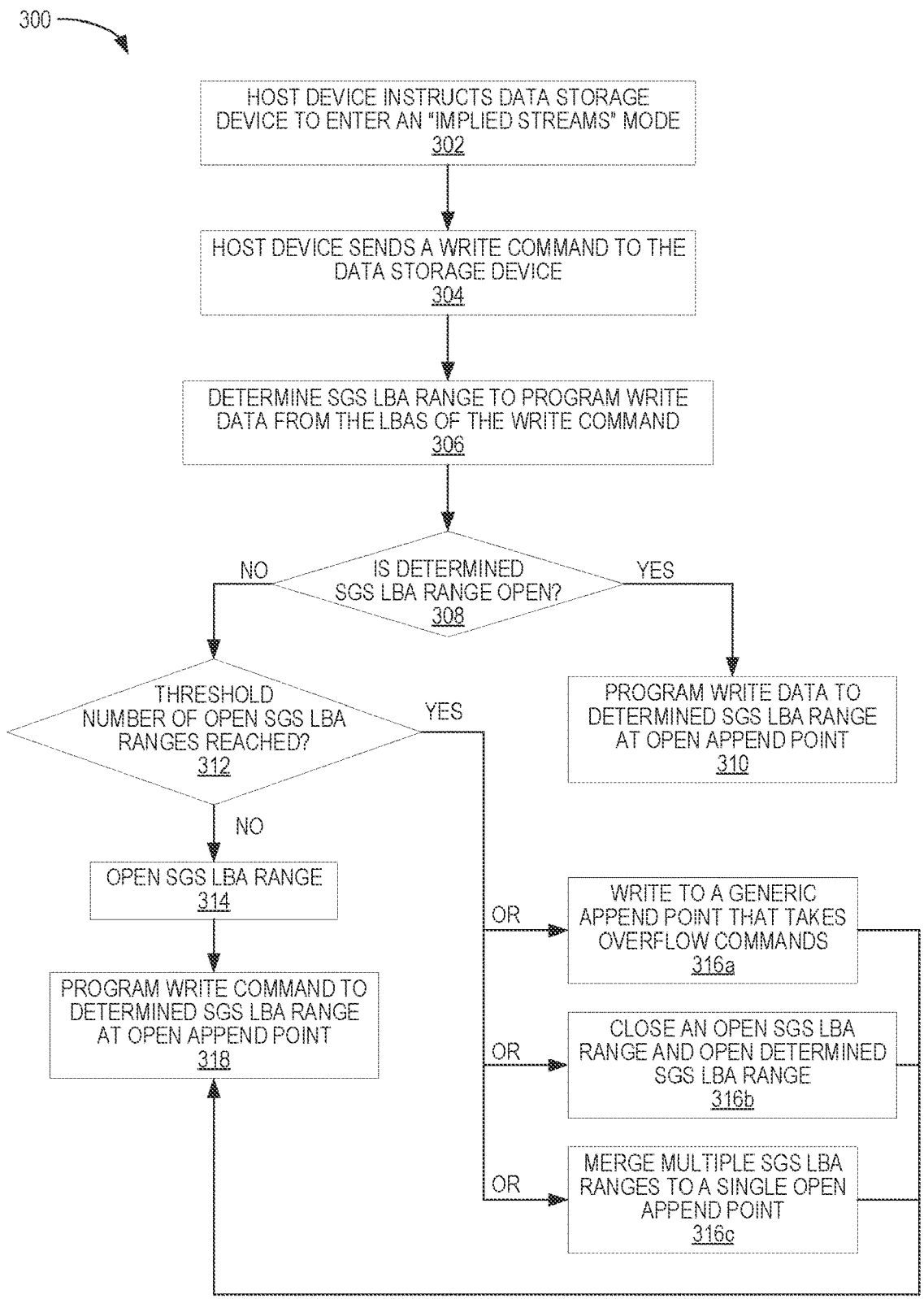
FIG. 3 is a flow diagram illustrating a method of operating a data storage device having implied stream capability, according to certain embodiments.

FIG. 3 is a flow diagram illustrating a method 300 of operating a data storage device, such as the data storage device 106 of FIG. 1, having implied stream capability, according to certain embodiments. Aspects of the storage system 100 of FIG. 1 may be referenced for exemplary purposes. For example, method 300 may be implemented by the controller 108.

At block 302, the host device 104 instructs the data storage device 106 to enter an "implied streams" mode. When the data storage device 106 is in the "implied streams" mode, the controller 108 may determine the stream to program the data of the write command to utilizing the one or more LBAs of the write command. At block 304, the host device 104 sends a write command to the data storage device 106. The write command is received by the controller 108 of the data storage device 106. At block 306, the controller 108 determines the SGS LBA range to program the write data from the one or more LBAs of the write command. For example, the controller 108 may determine that the one or more LBAs are associated with a certain type of data and may determine that the corresponding stream is more suited for the certain type of data. For example, certain streams may be more suited for high volume/access and other streams may be more suited for certain data types, such as video data, audio data, and the like.

At block 308, the controller 108 determines if the determined SGS LBA range is open. If the determined SGS LBA range is open at block 308, then the data of the write command is programmed to the determined SGS LBA range at the open append point at block 310. However, if the determined SGS LBA range is not open at block 308, then the controller 108 further determines if a threshold number of open SGS LBA ranges has been reached at block 312. For example, if the threshold number of open SGS LBA ranges is 10, then a maximum of 10 SGS LBA ranges may be opened. In order to open an 11th SGS LBA range, one or more of the 10 open SGS LBA ranges is closed to open the 11th SGS LBA range. If the threshold number of open SGS LBA ranges has not been reached at block 312, then the relevant SGS LBA range is opened at block 314 and the data of the write command is programmed to the determined SGS LBA range at the open append point at block 318.

In one embodiment, if the threshold number of open SGS LBA ranges has been reached at block 312, then the controller 108 may write to a generic append point that takes overflow commands at block 316a. For example, the generic append point may be a SGS LBA range that is partitioned or appropriated as the spare overflow area. In another example, the SGS LBA range may be a range that is not very full, such that the SGS LBA range is converted to the spare overflow area. The spare overflow SGS LBA range may be dynamically decided, such that over the lifespan of the data storage device 106, multiple (one or more) different spare overflow SGS LBA ranges may be valid.

In another embodiment, if the threshold number of open SGS LBA ranges has been reached at block 312, then the controller 108 may close an open SGS LBA range and open the determined SGS LBA range at block 316b. The open SGS LBA range chosen to be closed may either be one that has been least recently used, one that has had the least writes over a period of recent time (e.g., a moving average of writes), one that is closest to the end of the SGS LBA range and/or the end of the open append superblock, or a weighted combination of the previously listed options. The SGS LBA range chosen to be closed may be reopened at a new SGS LBA range.

In yet another embodiment, if the threshold number of open SGS LBA ranges has been reached at block 312, then the controller 108 may merge multiple SGS LBA ranges to a single open append point at block 316c. In order to determine which SGS LBA ranges to merge, the controller 108 may maintain a list of active SGS LBA ranges associated with each open append point. The SGS LBA ranges that are merged together may be picked based on the closeness of the associated open append points, fullness of the SGS LBA ranges, and the like.

By inferring which streams to place data into based on one or more LBAs of the data, write performance, latency, and endurance of the data storage device may be improved.

In one embodiment, a data storage device comprises: a memory device having stream architecture, the stream architecture dividing the memory device into a plurality of streams; and a controller coupled to the memory device, the controller configured to: enter an implied streams mode; receive a write command from a host device; and determine a stream associated with the write command based on one or more logical block addresses (LBAs) of the write command, wherein a stream identifier (ID) is not sent with the write command.

The controller is further configured to divide the memory device into a discrete number of stream granularity size (SGS) contiguous LBA ranges. The controller is further configured to maintain a list of open append points, and wherein each open append point of the list of open append points is associated with a SGS LBA range of the discrete number of SGS contiguous LBA ranges. The controller is further configured to determine if the write command is for an open SGS LBA range of the discrete number of SGS contiguous LBA ranges. The controller is further configured to schedule the write command to the open SGS LBA range upon determining that the write command is for the open SGS LBA range. The controller is further configured to open a new append point for a new open SGS LBA range when the write command is not for the open SGS LBA range. The controller is further configured to schedule the write command to the new append point for the new open SGS LBA range. The controller is further configured to schedule the write command for a generic append point that takes overflow commands when the write command is not for the open SGS LBA range. The controller is further configured to merge two or more open SGS LBA ranges to a single open append point when the write command is not for the open SGS LBA range. The controller is further configured to schedule the write command to the single open append point.

In another embodiment, a data storage device comprises: a memory device having stream architecture, the stream architecture dividing the memory device into a plurality of streams; and a controller coupled to the memory device, the controller configured to: receive an indication from a host device to enter an implied streams mode, wherein the host device does not send a stream identifier (ID) with a write command during the implied streams mode; and determine a stream associated with a write command based on one or more logical block addresses (LBAs) for each write command received from the host device.

The controller is further configured to determine that the stream associated with the write command is not for an open stream based on the one or more LBAs of the write command. The controller is further configured to determine if a threshold number of open streams is reached when the stream associated with the write command is not for the open stream. The controller is configured to: open another new open stream when the threshold number of open streams is not reached; and program the data of the write command to a first open append point of the new open stream. When the threshold number of open streams is reached, the controller is further configured to either: write the data of the write command to a generic append point, wherein the generic append point is for a stream granularity size (SGS) LBA range associated with overflow commands; close an open SGS LBA range, open a new SGS LBA range associated with the one or more LBAs of the write command, and write the data of the write command to a first open append point of the new SGS LBA range; or merge two or more SGS LBA ranges to a single open append point and write the data of the write command to the single open append point. The open SGS LBA range that is closed is either: a least recently used SGS LBA range of a plurality of SGS LBA ranges; a SGS LBA range of the plurality of SGS LBA ranges having a least number of writes over a window of time; or a closest-to-the-end SGS LBA range of the plurality SGS LBA ranges, wherein the closest-to-the-end SGS LBA range is a SGS LBA range that is closest to an end of a current SGS LBA range and/or to an end of an open append superblock. The open SGS LBA range that is closed is based on a weighted combination of at least two of: a least recently used SGS LBA range of a plurality of SGS LBA ranges; a SGS LBA range of the plurality of SGS LBA ranges having a least number of writes over a window of time; and a closest-to-the-end SGS LBA range of the plurality SGS LBA ranges, wherein the closest-to-the-end SGS LBA range is a SGS LBA range that is closest to an end of a current SGS LBA range and/or to an end of an open append superblock.

In another embodiment, a data storage device comprises: memory means having stream architecture, the stream architecture dividing the memory means into a plurality of streams; and a controller coupled to the memory means, the controller configured to: program data of a write command to a stream of the plurality of streams, wherein the stream is selected based on one or more logical block addresses (LBAs) of the write command, wherein each stream has a plurality of stream granularity size (SGS) LBA ranges, and wherein a stream identifier (ID) is not included with the write command.

The controller is further configured to maintain a list of open append points, wherein the list of open append points is maintained in a flash translation layer (FTL) table, and wherein each open append point of the list open append points is associated with a SGS LBA range of the plurality of SGS LBA ranges. The controller is configured to: determine that the stream is associated closed SGS LBA range; select and/or open and select an open append point for another SGS LBA range; and program the data of the write command to the selected open append point.

While the foregoing is directed to embodiments of the present disclosure, other and further embodiments of the disclosure may be devised without departing from the basic scope thereof, and the scope thereof is determined by the claims that follow.

What is claimed is:

1. A data storage device, comprising:
   a memory device having stream architecture, the stream architecture dividing the memory device into a plurality of streams; and
   a controller coupled to the memory device, the controller configured to:
      enter an implied streams mode;
      receive a write command from a host device; and determine a stream associated with the write command based on one or more logical block addresses (LBAs) of the write command, wherein a stream identifier (ID) is not sent with the write command.

2. The data storage device of claim 1, wherein the controller is further configured to divide the memory device into a discrete number of stream granularity size (SGS) contiguous LBA ranges.

3. The data storage device of claim 2, wherein the controller is further configured to maintain a list of open append points, and wherein each open append point of the list of open append points is associated with a SGS LBA range of the discrete number of SGS contiguous LBA ranges.

4. The data storage device of claim 2, wherein the controller is further configured to determine if the write command is for an open SGS LBA range of the discrete number of SGS contiguous LBA ranges.

5. The data storage device of claim 4, wherein the controller is further configured to schedule the write command to the open SGS LBA range upon determining that the write command is for the open SGS LBA range.

6. The data storage device of claim 4, wherein the controller is further configured to open a new append point for a new open SGS LBA range when the write command is not for the open SGS LBA range.

7. The data storage device of claim 6, wherein the controller is further configured to schedule the write command to the new append point for the new open SGS LBA range.

8. The data storage device of claim 4, wherein the controller is further configured to schedule the write command for a generic append point that takes overflow commands when the write command is not for the open SGS LBA range.

9. The data storage device of claim 4, wherein the controller is further configured to merge two or more open SGS LBA ranges to a single open append point when the write command is not for the open SGS LBA range.

10. The data storage device of claim 9, wherein the controller is further configured to schedule the write command to the single open append point.

11. A data storage device, comprising:
a memory device having stream architecture, the stream architecture dividing the memory device into a plurality of streams; and
a controller coupled to the memory device, the controller configured to:
receive an indication from a host device to enter an implied streams mode, wherein the host device does not send a stream identifier (ID) with a write command during the implied streams mode; and
determine a stream associated with a write command based on one or more logical block addresses (LBAs) for each write command received from the host device.

12. The data storage device of claim 11, wherein the controller is further configured to determine that a first stream associated with a first write command is not for any open stream of a plurality of open streams based on the one or more LBAs of the first write command.

13. The data storage device of claim 12, wherein the controller is further configured to determine if a threshold number of open streams is reached when the first stream associated with the first write command is not for any open stream of the plurality of open streams.

14. The data storage device of claim 13, wherein the controller is configured to:
open a new open stream when the threshold number of open streams is not reached; and
program data of the first write command to a first open append point of the new open stream.

15. The data storage device of claim 13, wherein, when the threshold number of open streams is reached, the controller is further configured to either:
write data of the first write command to a generic append point, wherein the generic append point is for a stream granularity size (SGS) LBA range associated with overflow commands;
close an open SGS LBA range, open a new SGS LBA range associated with the one or more LBAs of the first write command, and write the data of the first write command to a first open append point of the new SGS LBA range; or
merge two or more SGS LBA ranges to a single open append point and write the data of the first write command to the single open append point.

16. The data storage device of claim 15, wherein the open SGS LBA range that is closed is either:
a least recently used SGS LBA range of a plurality of SGS LBA ranges;
a SGS LBA range of the plurality of SGS LBA ranges having a least number of writes over a window of time; or
a closest-to-the-end SGS LBA range of the plurality SGS LBA ranges, wherein the closest-to-the-end SGS LBA range is a SGS LBA range that is closest to an end of a current SGS LBA range and/or to an end of an open append superblock.

17. The data storage device of claim 15, wherein the open SGS LBA range that is closed is based on a weighted combination of at least two of:
a least recently used SGS LBA range of a plurality of SGS LBA ranges;
a SGS LBA range of the plurality of SGS LBA ranges having a least number of writes over a window of time; and
a closest-to-the-end SGS LBA range of the plurality SGS LBA ranges, wherein the closest-to-the-end SGS LBA range is a SGS LBA range that is closest to an end of a current SGS LBA range and/or to an end of an open append superblock.

18. A data storage device, comprising:
memory means having stream architecture, the stream architecture dividing the memory means into a plurality of streams; and
a controller coupled to the memory means, the controller configured to:
program data of a write command to a stream of the plurality of streams, wherein the stream is selected based on one or more logical block addresses (LBAs) of the write command, wherein each stream has a plurality of stream granularity size (SGS) LBA ranges, and wherein a stream identifier (ID) is not included with the write command; and
maintain a list of open append points, wherein the list of open append points is maintained in a flash translation layer (FTL) table, and wherein each open append point of the list of open append points is associated with a SGS LBA range of a plurality of SGS LBA ranges.

19. A data storage device, comprising:
memory means having stream architecture, the stream architecture dividing the memory means into a plurality of streams; and
a controller coupled to the memory means, the controller configured to:
program a data of a write command to a stream of the plurality of streams, wherein the stream is selected based on one or more logical block addresses (LBAs) of the write command, wherein each stream has a plurality of stream granularity size (SGS) LBA ranges, and wherein a stream identifier (ID) is not included with the write command;
determine that the stream is associated with a closed SGS LBA range;
select and/or open an open append point for another SGS LBA range; and
program the data of the write command to the open append point.

* * * * *